United States Patent [19]

Fotland et al.

[11] 4,155,093

[45] May 15, 1979

[54] METHOD AND APPARATUS FOR GENERATING CHARGED PARTICLES

[75] Inventors: Richard A. Fotland; Jeffrey J. Carrish, both of Holliston, Mass.

[73] Assignee: Dennison Manufacturing Company, Framingham, Mass.

[21] Appl. No.: 824,252

[22] Filed: Aug. 12, 1977

[51] Int. Cl.² .................... G03G 15/044; G01D 15/06

[52] U.S. Cl. .................................. 346/159; 315/111.8

[58] Field of Search ................ 346/159; 313/207, 220, 313/217; 315/11.8, 169 TV; 250/423, 426

[56] References Cited

U.S. PATENT DOCUMENTS

| | | | |
|---|---|---|---|
| 3,005,930 | 10/1961 | Mason | 313/207 |
| 3,438,053 | 4/1969 | Howell | 346/159 |
| 3,450,929 | 6/1969 | Dibbern | 313/131 R |
| 3,513,351 | 5/1970 | Kelley | 250/426 |
| 3,569,756 | 3/1971 | Reifenschweiler | 250/426 |
| 3,715,762 | 2/1973 | Magill | 346/159 |
| 3,735,183 | 5/1973 | Walters | 313/217 |
| 3,765,027 | 10/1973 | Bresnick | 346/159 |
| 3,787,876 | 1/1974 | Pressman | 346/159 |
| 3,877,038 | 4/1975 | Krekow | 346/159 |
| 3,890,519 | 6/1975 | Chafer | 313/131 R |
| 4,037,130 | 7/1977 | Mimitsuka | 313/220 |
| 4,087,807 | 5/1978 | Miavecz | 315/169 TV |

FOREIGN PATENT DOCUMENTS

| | | | |
|---|---|---|---|
| 1437854 | 6/1973 | United Kingdom | 346/159 |

*Primary Examiner*—Jay P. Lucas
*Attorney, Agent, or Firm*—George E. Kersey

[57] ABSTRACT

Generation of charged particles, e.g. ions, by extracting them from a high density source provided by an electrical gas breakdown in an electric field between two conducting electrodes separated by an insulator. When a high frequency electric field is applied, surprisingly high ion current densities can be obtained, providing numerous advantages over conventional ion forming techniques for use in electrostatic printing and office copying, as well as in electrostatic discharging, precipitation, separation, and coating.

29 Claims, 11 Drawing Figures

METHOD AND APPARATUS FOR GENERATING CHARGED PARTICLES

BACKGROUND OF THE INVENTION

This invention relates to the generation of charged particles, and more particularly, to the generation of ions with high current densities.

Ions can be generated in a wide variety of ways. Common techniques include the use of air gap breakdown, corona discharges and spark discharges. Other techniques employ triboelectricity, radiation (Alpha, Beta, and Gamma, as well as x-rays and ultra-violet light) and microwave breakdown.

Air gap breakdown, i.e., discharges occurring in small gaps between a stylus or wire and the surface of a dielectric material, are widely employed in the formulation of electrostatic images. Representative U.S. Pat. Nos. are G. R. Mott 3,208,076; E. W. Marshall 3,631,509; A. D. Brown, Jr. 3,662,396; A. E. Bliss et al. 3,792,495; R. F. Borelli 3,958,251; and R. T. Lamb 3,725,950.

In the case of an air gap breakdown, it is necessary that the gap spacing be maintained between about 0.0002 and 0.0008 inches in order to be able to operate with applied potentials at reasonable levels and maintain charge image integrity. Even then, the latent charge image is not uniform, so that the resultant electrostatically toned image lacks good definition and dot fill.

An alternative to air gap between is the corona discharge from a small diameter wire or a point source. Illustrative U.S. Pat. Nos. are P. Lee 3,358,289; Lee F. Frank 3,611,414; A. E. Jvirblis 3,623,123; H. Bresnik 3,765,027; P. J. Magill et al. 3,715,762; and R. A. Fotland 3,961,574. Corona discharges are widely employed in electrostatic precipitation, and are used almost exclusively in electrostatic copiers to charge photoconductive surface prior to exposure. Corona discharges are also extensively employed in electrostatic separators and in electrostatic coating and spraying equipment.

Unfortunately, standard corona discharges provide limited currents. The maximum discharge current density heretofore obtained has been on the order of 10 microamperes per square centimeter. This can impose a severe printing speed limitation. In addition, coronas can create significant maintenance problems. Corona wires are small and fragile and easily broken. Because of their high operating potentials, they collect dirt and dust and must be frequently cleaned or replaced.

An alternative technique for forming high density corona discharges is to use high velocity air streams. For example, if high pressure air is employed with a small orifice at the corona discharge point, current densities as high as 1000 microamperes per square centimeter are reportedly obtainable (Proceedings of the Conference on Static Electrification, London 1967, Page 139 of The Institute of Physics and Physical Society, London SW1). This technique is awkward, however, and requires both a pressurized air source and critical geometry in order to prevent premature electrical breakdown.

Another method of forming ions, which is particularly useful in electrostatic applications, uses an electrical spark discharge. Representative U.S. Pat. Nos. are B. E. Byrd 3,321,768; H. Epstein 3,335,322; C. D. Hendricks, Jr. 3,545,374; and W. P. Foster 3,362,325. A low energy spark discharge technique is described by Krekow and Schram in IEEE transactions on Electronic Devices, E.D.-21 #3, Page 189, March, 1974. The electrical spark discharge is objectionable, however, where uniform ion currents are desired or required. This is particularly true where the discharge occurs over the surface of a dielectric.

Accordingly, it is an object of the invention to facilitate the generation of ions, particularly at high current densities.

Another object is to provide a reliable and stable source of ions. A related object is to provide an ion generating system which does not require critical periodic maintenance. Another related object is to simplify maintenance and eliminate the objectionable characteristics of corona wires, including the fragility and tendency to collect dirt and dust.

A further object of the invention is to provide an easily controlled source of ions. A related object is to provide a multiplexable source of ions using different voltage sources to supply an alternating breakdown field and an ion extraction field.

Yet another object of the invention is to generate ion currents for use in producing electrostatic images in which charge image integrity is maintained. A related object is to achieve comparatively uniform charge images which can be toned with good definition and dot fill.

Further objects are to achieve increased electrostatic printing speed; suitable charge densities without requiring a pressurized air source and critical electrode geometry; and uniform ion density.

SUMMARY OF THE INVENTION

In accomplishing the foregoing and related objects, the invention provides for applying a potential between two electrodes separated by a dielectric member to cause an electrical air gap breakdown in fringing field regions. Ions thus produced can then be extracted from the discharge and applied to a further member.

In accordance with one aspect of the invention, the further member can be a conductive support with a dielectric coating.

In accordance with another aspect of the invention, the discharge initiating potential is a high frequency alternating voltage, and the extraction is accomplished using a direct voltage.

In accordance with yet another aspect of the invention the extracted ions can be used directly or applied to particulate matter, which is moved under the action of an electric field. Such charged particles can be used in forming an electrostatic pattern using, for example, a discharge electrode with a gap patterned in accordance with the configuration of a character or symbol for which a charge image is desired.

According to a further aspect of the invention the electrodes can be multiple electrodes forming cross points in a matrix array. Ions are extracted from electrode apertures at selected matrix crossover points by simultaneously providing both an electrical discharge at the selected apertures and an external ion extraction field.

The extracted ions can be used to form an electrostatic latent image which is subsequently toned and fused. The image can be formed on a dielectric layer and transferred to plain paper. Alternately, charged particulate matter can be deposited on plain paper to form a visible image, or collected on a conducting surface.

According to still another aspect of the invention the apparatus is formed by a dielectric member which separates two electrodes, at least one of which has an edge on the surface of the dielectric member. When a voltage is applied between the electrodes, for example, an alternating voltage in the frequency range from about 60 hertz to about 4 megahertz, an electrical discharge is produced between one of the electrodes and the dielectric surface. The electrodes, which can be alike or different, can take a wide variety of forms, including an open mesh woven metallic screen.

DESCRIPTION OF THE DRAWINGS

Other objects of the invention will become apparent after considering several illustrative embodiments, taken in conjunction with the drawings in which.

DETAILED DESCRIPTION

Turning to the drawings, an ion generator 10 in accordance with the invention is used in producing an air gap breakdown between a dielectric 11 and respective conducting electrodes 12-1 and 12-2 using a source 13 of alternating potential. When electric fringing field $E_A$ and $E_B$ in the air gaps **14-*a* and 14-*b* exceed the breakdown field of air, an electric discharge occurs which results in the charging of the dielectric 11 in regions 11-*a* and 11-*b* adjacent electrode edges. Upon reversal of the alternating potential of the source 13, there is a charge reversal in the breakdown regions 11-*a* and 11-*b*. The generator 10 of FIG. 1, therefore, produces an air gap breakdown twice per cycle of applied alternating potential from the source 13** and thus generates an alternating polarity supply of ions.

Figure 1:
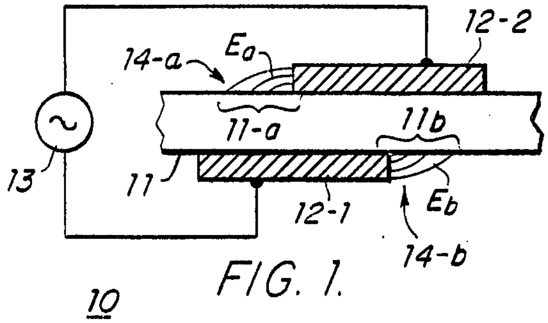
FIG. 1 is a schematic and sectional view of an ion generator in accordance with the invention.
Figure 2:
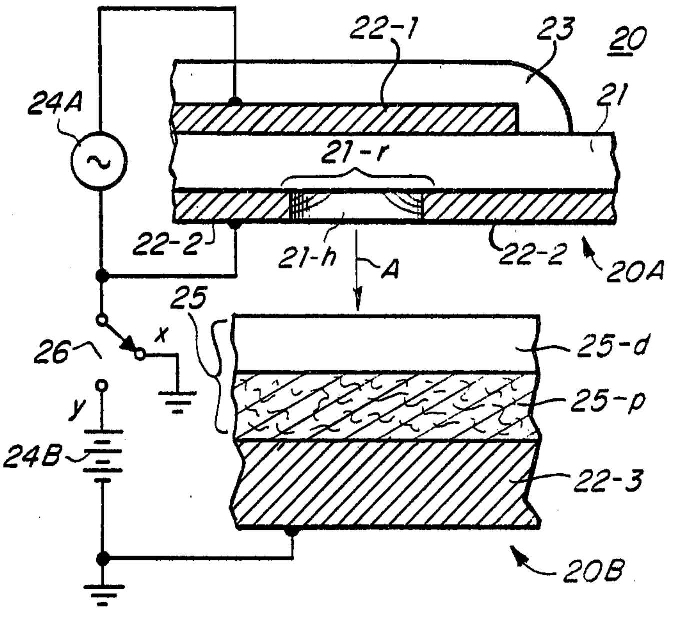
FIG. 2 is a schematic and sectional view of a generator and ion extractor in accordance with the invention.

The extraction of ions produced in accordance with the generator 10 of FIG. 1 is illustrated by the generator-extractor 20 of FIG. 2. The generator $20_A$ includes a dielectric 21 between conducting electrodes 22-1 and 22-2. In order to prevent air gap breakdown near electrode 22-1, the electrode 22-1 is encapsulated or surrounded by an insulating material 23. Alternating potential is applied between the conducting electrodes 22-1 and 22-2 by a source $24_A$. In addition, the second electrode 22-2 has a hole 22-h where the desired air gap breakdown occurs relative to a region 21-r of the dielectric 21 to provide a source of ions.

The ions formed in the gap **21-*h* may be extracted by a direct current potential applied from a source 24-B to provide an external electric field between the electrode 22-2 and a grounded auxiliary electrode 22-3. An illustrative insulating surface to be charged by the ion source in FIG. 2 is a dielectric (electrographic) paper 25 consisting of a conducting base 25-P coated with a thin dielectric layer 25-*d***.

When a switch 26 is switched to position X and is grounded as shown, the electrode 22-2 is also at ground potential and no external field is present in the region between the ion generator $20_A$ and the dielectric paper 25. However, when the switch 26 is switched to position y, the potential of the source $24_B$ is applied to the electrode 21-2. This provides an electric field between the ion reservoir 21-r and the backing of dielectric paper 25. The ions extracted from the air gap breakdown region then charge the surface of the dielectric layer 25-d.

The generator and ion extractor 20 of FIG. 2 is readily employed, for example, in the formation of characters on dielectric paper in high speed electrographic printing. Illustrative sources for the electrographic printing of characters in accordance with the invention are shown in FIGS. 3 and 4.

Figure 3:
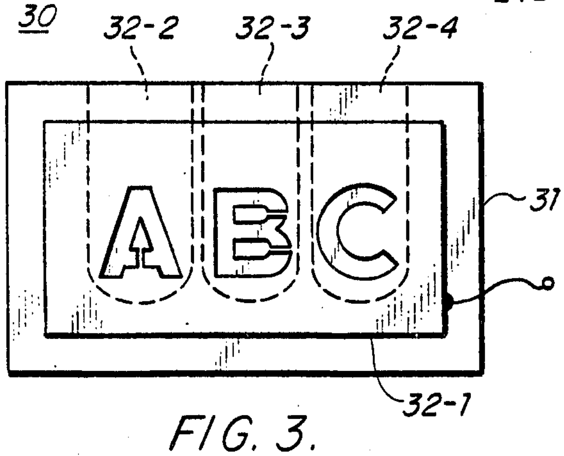
FIG. 3 is a plan view of an ion generator for use in electrostatic printing.

In FIG. 3 a character generator 30 is formed by a dielectric member 31 which is sandwiched between an etched conducting sheet 32-1 and a set of counterelectrodes 32-2, 32-3 and 32-4.

The etched or mask electrode 32-1 illustratively is shown with etched characters A, B and C. The fringing fields at the edges of the etched characters provide a high density source of ions when an air gap breakdown according to the invention is produced by alternating potential applied between the etched electrode 32-1 and the counterelectrodes. Thus when it is desired to generate ions for printing a selected character, such as the letter B, a source of high frequency alternating voltage (not shown) is applied between the etched electrode 32-1 and the associated counterelectrode 32-3. This provides a high density supply of ions in the region of the dielectric 31 at the edges of the etched character B in the mask 32-1. The ions are then extracted and transferred to a suitable dielectric surface, for example the dielectric coated paper 25 of FIG. 2, by the application of a direct voltage between the paper backing and the mask 32-1, resulting in the formation of the electrographic latent image B on the dielectric surface of the paper 25.

Figure 4:
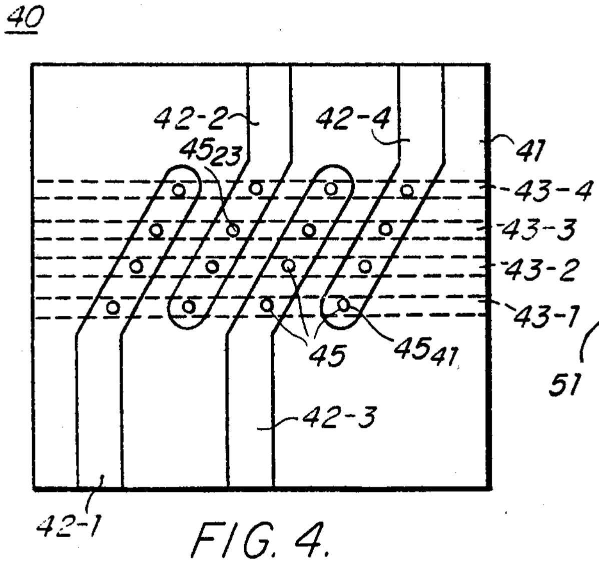
FIG. 4 is a plan view of a matrix ion generator for implementing the invention in dot matrix printing.

To employ the invention in the formation of dot matrix characters on dielectric paper, the matrix ion generator 40 of FIG. 4 may be employed. The generator 40 makes use of a dielectric sheet 41 with a set of apertured air gap breakdown electrodes 42-1 through 42-4 on one side and a set of selector bars 43-1 through 43-4 on the other side, with a separate selector 43 being provided for each different aperture 45 in each different finger electrode 42.

When an alternating potential is applied between any selector bar 43 and ground, ions are generated in apertures at the intersections of that selector bar and the finger electrodes. Ions can only be extracted from an aperture when both its selector bar is energized with a high voltage alternating potential and its finger electrode is energized with a direct current potential applied between the finger electrode and the counterelectrode of the dielectric surface to be charged. Matrix location $45_{23}$, for example, is printed by simultaneously applying a high frequency potential between selector bar 43-3 and ground and a direct current potential between finger electrode 42-2 and a dielectric receptor member's counterelectrode. Unselected fingers as well as the dielectric members counterelectrode are maintained at ground potential.

By multiplexing a dot matrix array in this manner, the number of required voltage drivers is significantly reduced. If, for example, it is desired to print a dot matrix array across an 8" wide area at a dot matrix resolution of 200 dots per inch, 1600 separate drivers would be required if multiplexing were not employed. By utilizing the array of FIG. 4 with, for example, 20 alternating frequency driven fingers, only 80 finger electrodes would be required and the total number of drivers is reduced from 1600 to 100.

In order to prevent air gap breakdown from electrodes 42 to the dielectric member 41 in regions not associated with apertures 45, it is desirable to coat the edges of electrodes 42 with an insulating material. Unnecessary air gap breakdown around electrodes 43 may be eliminated by potting these electrodes.

Figure 5:
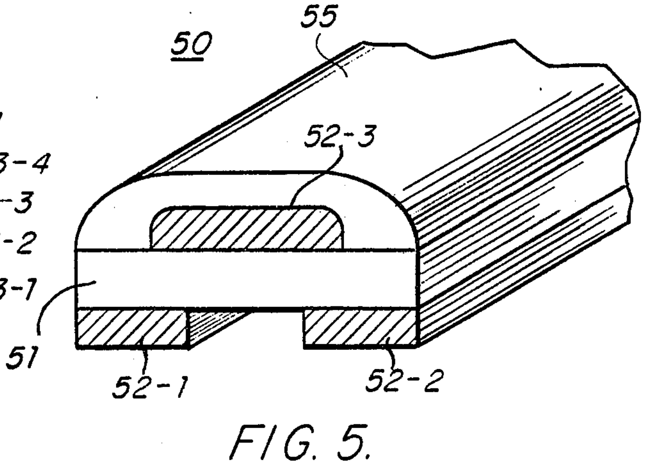
FIG. 5 is a partial perspective view of a physical model of an ion generator in accordance with the invention.

The invention may be employed to form a rectangular area of charge using geometry of the module 50 shown in FIG. 5. Charging electrodes 52-1 and 52-2 are separated from the electrode 52-3 by a dielectric member 51, with the electrode 52-3 potted in an insulator 55. The region between the electrode 52-1 and 52-2 provides a slot in which an air gap discharge is formed when a high frequency alternating potential is applied between electrodes 52-1 and 52-2 and electrode 52-3.

The charging array of FIG. 5 may be employed in a plain paper copier to replace the coronas normally found in such a copier.

Figure 6:
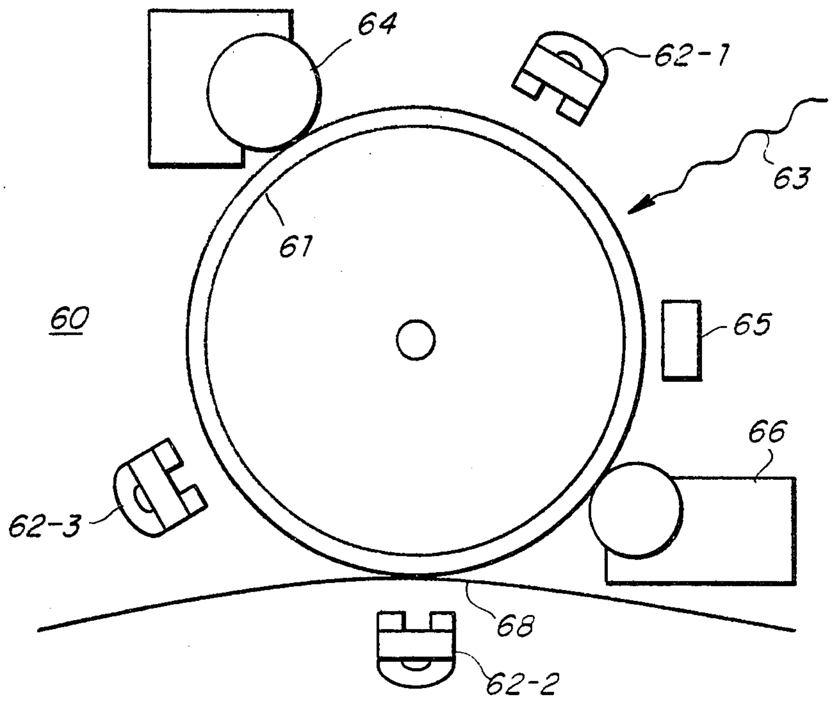
FIG. 6 is a schematic view of an illustrative copier implemented using the invention.

FIG. 6 illustrates schematically a plain paper copier employing charging arrays of the kind shown in FIG. 5. A copier drum 61 is charged using a charging element 62-1, having the configuration shown in FIG. 5. If the drum is selenium or a selenium alloy and it is desired to charge the surface, for example, to a positive potential of 600 volts, then the slotted electrode 62-1 is maintained at 600 volts. After charging, the drum 61 is discharged with an optical image provided by a scanner at station 63. The resulting latent electrostatic image is toned at station 66 and the toner is transferred to a plain paper sheet 68, using a transfer ion generator 62-2 according to FIG. 5, with the slotted electrode again maintained at a positive potential. The latent residual electrostatic image in the surface of the drum and any uncharged toner may be electrically discharged by employing a discharge unit 62-3, also according to FIG. 5. Here the slotted electrode is maintained at ground potential and any residual charge on the surface of the drum and toner causes ions to be extracted from the air gap breakdown in the slot, thus effectively discharging the surface. A cleaning brush 64 is employed to remove residual toner remaining on the surface and the drum is then ready to be recharged.

Also shown in FIG. 6 is a dot matrix charging head 65 which may be configured according to FIG. 4. This permits a plain paper copier to be employed as a printer. In that event the drum 61 is discharged at station 63 and recharged by the dot matrix printing head 65, permitting the machine 60 to function both as a copier and a printer. In addition, the apparatus 60 may function simultaneously as a copier and printer where overlays are desired.

Figure 7:
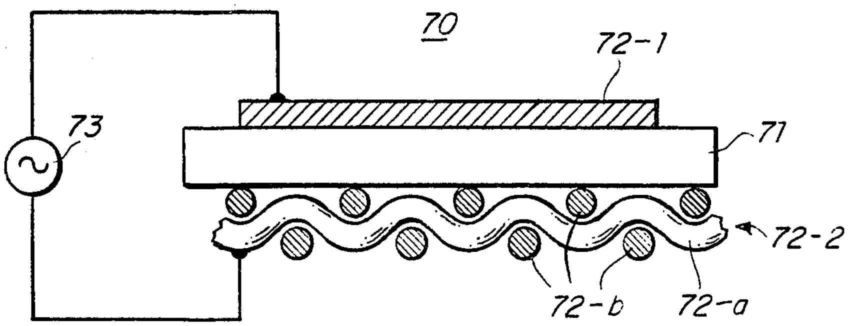
FIG. 7 is a sectional view of an alternative ion source for implementing the invention.

FIG. 7 illustrates an alternative ion generator 70 in accordance with the invention for use in charging or discharging an insulating surface. In FIG. 7 the slotted electrode 52-1, 52-2 of FIG. 5 is replaced by an open mesh screen 72-2 with longitudinal elements 72-a and cross member 72-b. Discharge electrodes 72-1 and 72-2 are separated by dielectric sheet 71 and the air gap breakdown potential provided by alternating potential 73.

Figure 8:
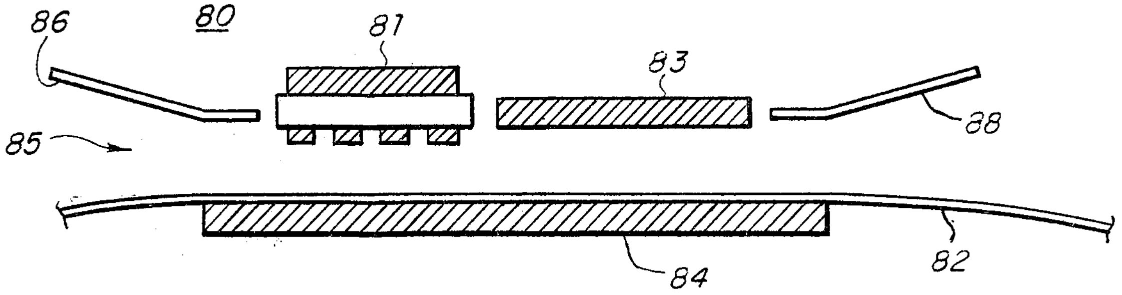
FIG. 8 is a sectional view of an aerosol charging system for high speed dot matrix printing.

FIG. 8 illustrates an apparatus 80 for applying a multiplexed dot matrix charging head 81 of the type shown in FIG. 4 in a system for high speed dot matrix printing on plain paper. The charging head 81 charges an aerosol 85, consisting of a dye dissolved in an appropriate solvent which is carried by a low velocity airstream introduced through a slot 86. The aerosol particles are charged by the ion generating system and enter an electric field region established by a direct potential supplied between electrodes 83 and 84. This field directs the charged aerosol particles onto a plain paper sheet 82 which moves through the apparatus at approximately the same speed as the velocity of the aerosol.

Figure 9:
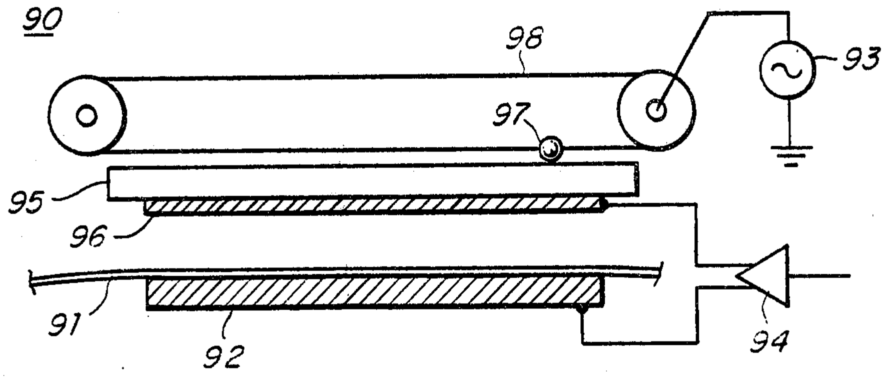
FIG. 9 is a sectional view of a line scan printing system in accordance with the invention.

FIG. 9 illustrates mechanical line scan printing in accordance with the invention. A slotted electrode 96 is employed with a dielectric film 95 and a rapidly moving conducting bead 97 to form a travelling air gap breakdown region. The bead 97 mounted on wire 98, is driven by pulleys from a high speed motor (not shown). A high frequency alternating current source 93 supplies the potential necessary to break down the air gap in the slot of electrode 96. In this example, a dielectric paper 91 is charged by a charging potential supplied by an amplifier 94 whose output is connected between the dielectric paper conductor support 92 and the slotted electrode 96. The line scan is effected by the mechanical motion of the bead 97 and selected areas are printed by applying a potential between the conducting sheet and slotted electrode. As in the previous cases, the latent electrostatic image that is formed may be toned and fused using any conventional technique. Continuous tone images may be formed in this manner since the quantity of ions extracted from the discharge is dependent upon the extraction potential supplied by the amplifier 94.

Figure 10:
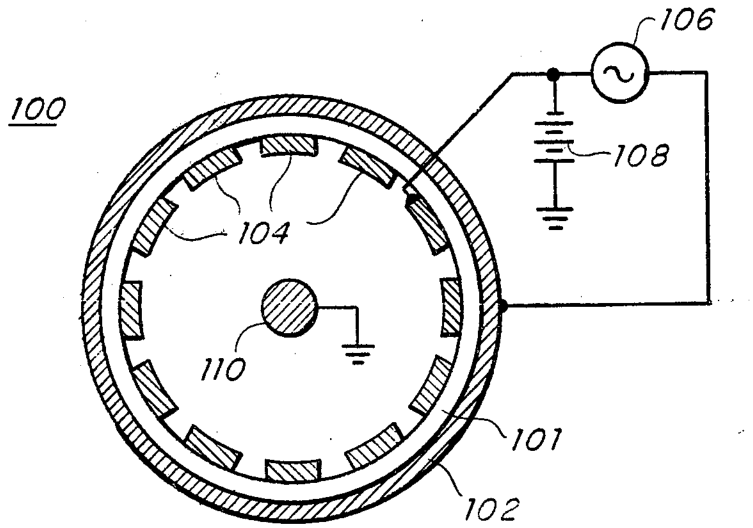
FIG. 10 is a sectional view of an electrostatic precipitator in accordance with the invention.

FIG. 10 illustrates the use of an ion generating system according to the invention as an electrostatic precipitator 100. A tubular electrode 102 is separated from a segmented electrode 104 by a dielectric 101. An air gap breakdown is produced in the open areas of the segmented electrode 104 through application of a high voltage alternating potential by a generator 106. The segmented electrode 104 is also biased by a direct potential source 108. A central ground wire 110 is mounted at the center of the tube 102. Stack gases or other aerosols may be cleaned through electrostatic precipitation by passage along the tube. The high current ion density from the air gap breakdown regions charges solid particles in the aerosol and causes them to be attracted to central electrode 110.

Figure 11:
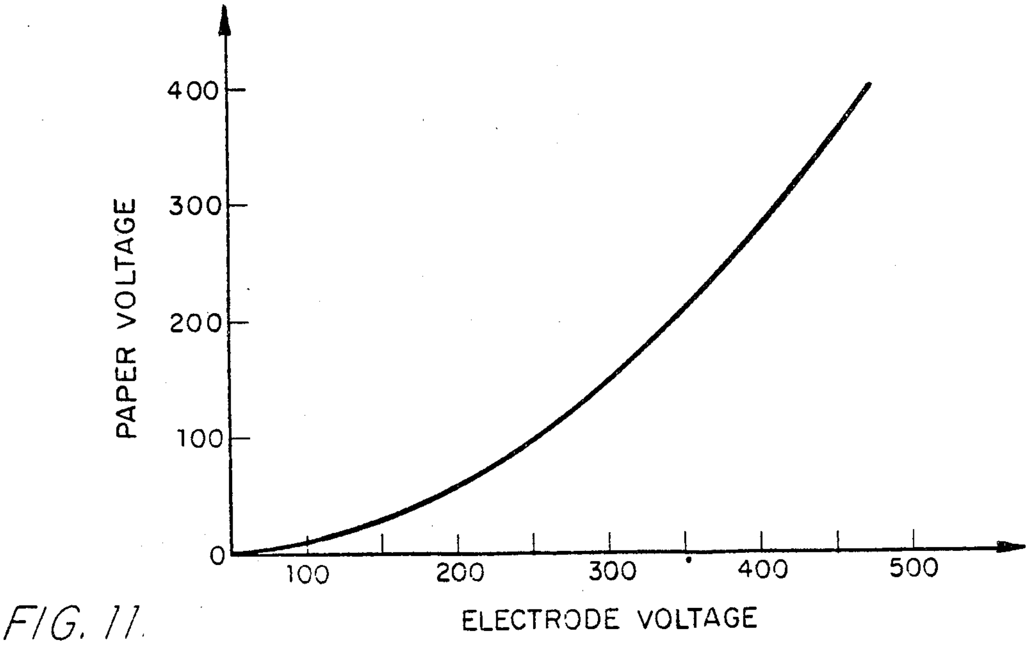
FIG. 11 is a graph illustrating the relationship between electrode voltage and paper voltage in accordance with the invention.

In general, the relationship between the electrode voltage and that of the ion receiving surface, for example, paper, is typically that shown in FIG. 11 for charging systems of the type shown in FIGS. 2, 3, 4, and 5. The electrode voltage is the direct potential impressed between the apertured electrodes and the counterelectrode of the dielectric surface being charged. The paper voltage is the electrostatic latent image potential of the charged dielectric members—dielectric (electrographic) paper in the example.

The foregoing examples of the use of the ion generating system of the invention illustrate its wide applicability. In general, the corona wires or points of any present system may be replaced by the aparatus of the invention. In addition to the illustrated applications, the method and apparatus of the invention may be used in numerous other applications, not illustrated, such as those dealing with electrostatic separation and coatings.

EXAMPLES

The foregoing description illustrates the general principles and features of the invention. The following specific and non-limiting examples illustrate specific applications of the invention.

EXAMPLE I

A 1-mil stainless steel foil is laminated on both sides of corning code 8871 capacitor ribbon glass. The stainless foil is coated with resist and photo etched with a pattern similar to that shown in FIG. 4, with holes or apertures in the fingers approximately 0.006" in diameter. This provides a charging head which can be employed to generate latent electrostatic dot matrix character images on dielectric paper according to FIG. 2. Charging occurs only when there is simultaneously a potential of negative 400 volts on the fingers containing the holes and an alternating potential of 2 kilovolts peak at a frequency of 500 kilohertz supplied between the finger and the counter electrode. A spacing of 0.008" is maintained between the print head assembly and the dielectric surface of the electrographic sheet. The duration of the print pulse is 20 microseconds. Under these conditions, it is found that a latent electrostatic image of approximately 300 volts is produced on the dielectric sheet. This image is subsequently toned and fused to provide a dense dot matrix character image. The ion current extracted from this charging head, as collected by an electrode spaced 0.008" away from the head, is found to be 1 miliampere per square centimeter.

EXAMPLE II

Example I is repeated employing a polyimide dielectric rather than capacitor glass. As before, a 1-mil stainless steel foil is laminated to 1-mil thick Kapton® polyimide film. Results equivalent to those of Example I are obtained at an applied high frequency potential of 1.5 kilovolts peak.

EXAMPLE III

An electrostatic charging head of the type shown in FIG. 3 is fabricated employing 1-mil stainless steel foil laminated to both sides of 1-mil polyimide sheet. In order to print fully formed characters on a dielectric surface, 1/10" high characters are etched in the foil on one side of the sheet, while fingers covering each character are etched on the other side of the foil as indicated in FIG. 3. In order to establish conductivity within normally isolated areas of characters, bridges 1 to 2-mils in thickness are left unetched. The character stroke width is etched to 6-mils. Printing is carried out by applying the potentials of Example II with a pulse width of 40 microseconds. The toned images exhibit sharp edges and high optical density. The character stroke width in the image is 0.012".

EXAMPLE IV

The invention is applied to provide continuous tone imagery by extracting a number of ions from the charging head per unit time in proportion to the applied ion extraction potential. This is illustrated in FIG. 11 where the apparent surface potential on a dielectric surface is plotted as a function of the potential difference between the ion generating electrode and the dielectric counter electrode. The ion generating electrode dielectric surface spacing is 0.006" and the charging time is 50 microseconds.

The foregoing description and examples are illustrative only and other adaptations, modifications and equivalents of the invention will be apparent to those of ordinary skill in the art.

References to "alternating" in this specification shall include fluctuating wave forms, with or without a DC component, that provide air breakdown in opposite directions.

What is claimed is:

1. A method of generating ions in air which comprises applying an alternating potential between a first electrode substantially in contact with one side of a solid dielectric member and a second electrode substantially in contact with an opposite side of the solid dielectric member, said second electrode having an edge surface disposed opposite said first electrode to define an air region at the junction of the edge surface and the solid dielectric member, to induce ion producing electrical discharges in said air region between said solid dielectric member and the edge surface of said electrode, and applying an ion extraction potential between said second electrode and a further electrode member to extract ions produced by the electrical discharges in said air region.

2. The method of claim 1 further including the step of applying the extracted ions to a further member.

3. The method of claim 1 wherein said electrodes consist of a multiplicity of electrodes forming cross-points in a matrix array configured such that all electrodes on one side of said dielectric member contain apertures at matrix electrode crossover regions.

4. The method of claim 3 wherein ions are extracted from selected matrix crossover apertures by simultaneously providing both an electrical discharge in said aperture and an external ion extraction field.

5. The method of generating ions in air as recited in claim 4, for electrostatic printing, further comprising the steps of forming an electrostatic latent image with said extracted ions, and toning and fusing the electrostatic latent image.

6. The method of electrostatic printing of claim 5 wherein the electrostatic latent image is formed on a dielectric layer, further comprising the step of transferring the toned electrostatic latent image to plain paper.

7. The method of claim 1 wherein said further electrode member has a dielectric surface, further including the step of applying the extracted ions to said dielectric surface.

8. The method of claim 1 further comprising the step of directing a stream of aerosol particles between said air region and said further electrode member in order to apply ions to said aerosol particles to selectively charge said particles.

9. The method of claim 8 further comprising the step of physically moving the charged aerosol particles under the influence of an electric field between said second electrode and said further electrode member.

10. The method of claim 9 further comprising the step of collecting the charged aerosol particles on a surface of said further electrode member.

11. The method of claim 9 further comprising the step of interposing a receptor member between the aerosol particle stream and the further electrode member, whereby the charged aerosol particles are collected on said receptor member.

12. The method of claim 1 wherein the step of applying an ion extraction potential comprises applying a direct voltage between the second electrode and the further electrode member.

13. The method of claim 1 further comprising the step of forming an electrostatic pattern with said extracted ions.

14. The method of claim 13 wherein the step of forming an electrostatic pattern comprises forming a character or symbol defined by the configuration of said air region.

15. The method of claim 1 wherein the first electrode comprises an open mesh woven metal screen.

16. Apparatus for generating ions in air which comprises a solid dielectric member;

a first electrode substantially in contact with one side of said solid dielectric member;

a second electrode substantially in contact with an opposite side of said solid dielectric member, with an edge surface of said second electrode disposed opposite said first electrode to define an air region at the junction of said edge surface and said solid dielectric member;

means for applying an alternating potential between said first and second electrodes of sufficient magnitude to induce ion producing electrical discharges in said air region between the dielectric member and the edge surface of said second electrode; and means for applying an ion extraction potential between said second electrode and a further electrode member to extract ions produced by the electrical discharges in said air region.

17. Apparatus of claim 16 where dielectric is glass.

18. Apparatus of claim 16 where dielectric is a ceramic.

19. Apparatus as defined in claim 16 wherein said alternating potential varies periodically at a frequency between 60 Hertz and 4 Megahertz.

20. Apparatus as defined in claim 16 wherein said further electrode member comprises an ion receptor member.

21. Apparatus as defined in claim 16 wherein an ion receptor member is interposed between said further electrode member and said air region.

22. Apparatus as defined in claim 21 wherein said ion receptor member comprises a dielectric.

23. Apparatus as defined in claim 22 wherein said further electrode member and said ion receptor member comprise a conductive base with a dielectric coating.

24. Apparatus as defined in claim 23 wherein said further electrode member and said ion receptor member comprise conductive paper with a dielectric coating.

25. Apparatus as defined in claim 16 wherein edge surfaces in the second electrode comprise peripheral surfaces defining apertures in said second electrode.

26. Apparatus as defined in claim 25 wherein said apertures are configured in a prescribed character pattern.

27. Apparatus as defined in claim 26 wherein said prescribed character pattern is in the form of at least one dot.

28. Apparatus as defined in claim 16 wherein said first and second electrodes comprise a multiplicity of electrodes contacting a dielectric sheet and forming cross points in a matrix array, configured such that the first electrodes on one side of said dielectric sheet comprise selector bars, and the second electrodes on the other side of said dielectric sheet comprise air breakdown electrodes transversely oriented with respect to said selector bars, with apertures at matrix crossover regions.

29. Apparatus of claim 16 where dielectric member is a plastic film.

* * * * *